United States Patent
Cruz Mendez et al.

(10) Patent No.: US 9,738,123 B2
(45) Date of Patent: Aug. 22, 2017

(54) AUTOMATIC ACTIVATION OF WARNING SIGNAL UPON OCCURRENCE OF UNSAFE CONDITION DETECTED BY TIRE PRESSURE MONITORING SYSTEM

(71) Applicant: Continental Automotive Systems, Inc., Auburn Hills, MI (US)

(72) Inventors: David Cruz Mendez, Tlaquepague (MX); Ernesto Amezcua Maciel, Guadalajara (MX); Ignacio Padilla Rabadan, Zapopan (MX); Carlos Alfonso Rodriguez Gomez, Guadalajara (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/826,230

(22) Filed: Aug. 14, 2015

(65) Prior Publication Data

US 2017/0043632 A1     Feb. 16, 2017

(51) Int. Cl.
*B60C 23/04*     (2006.01)

(52) U.S. Cl.
CPC ...... *B60C 23/0406* (2013.01); *B60C 23/0433* (2013.01)

(58) Field of Classification Search
CPC .......................... B60C 23/0406; B60C 23/0433
USPC .......................................................... 340/447
See application file for complete search history.

(56) References Cited

U.S. PATENT DOCUMENTS

| | | | |
|---|---|---|---|
| 3,771,122 A | 11/1973 | Sattler | |
| 6,023,221 A | 2/2000 | Michelotti | |
| 6,879,251 B2 | 4/2005 | Robbins | |
| 8,742,914 B2 | 6/2014 | Deniau et al. | |
| 2005/0007246 A1 | 1/2005 | Yen et al. | |
| 2007/0279203 A1* | 12/2007 | Thomas | B60C 23/068 340/447 |
| 2012/0044064 A1* | 2/2012 | Maekawa | B60C 23/0408 340/447 |

FOREIGN PATENT DOCUMENTS

DE          3138888 A1     4/1983

* cited by examiner

*Primary Examiner* — Leon Flores

(57) ABSTRACT

A vehicle warning includes a tire pressure monitoring device disposed in each tire of the vehicle. Each tire pressure monitoring device obtains information regarding pressure within the associated tire and communicated the tire pressure information in a wireless manner. A receiver receives the communicated tire pressure information from each tire pressure monitoring device. A processor circuit, associated with the receiver, determines if the communicated tire pressure information from at least one of the tire pressure monitoring devices is significantly less than a tire pressure determined to be safe for vehicle operation and, if so, to generate a warning signal. A body control module, upon receiving the warning signal, automatically activates the hazard lights without driver input.

11 Claims, 3 Drawing Sheets

AUTOMATIC ACTIVATION OF WARNING SIGNAL UPON OCCURRENCE OF UNSAFE CONDITION DETECTED BY TIRE PRESSURE MONITORING SYSTEM

FIELD

The invention relates to vehicle safety and, in particular, to a system that automatically activates a warning signal, such as the vehicle's hazard lights, upon detection of a sudden loss of tire pressure.

BACKGROUND

Currently, when a vehicle is moving at high speed among other cars on a highway and suddenly has a loss of tire pressure, such as a flat tire, the driver may lose control of the vehicle for a short period of time. Once the driver has regained control of the vehicle the driver can then alert other drivers regarding the vehicle's situation by manually activating the hazard lights while pulling over to the shoulder of the road. However, since the driver typically cannot alert other drivers immediately when the flat tire occurs due to trying to control the vehicle, accidents can occur such as the disabled vehicle being struck from behind.

Thus, there is a need to provide a system and method that automatically activates a warning signal upon detection of sudden loss of tire pressure in at least one of the tires to warn nearby vehicles.

SUMMARY

An objective of the invention is to fulfill the need referred to above. In accordance with the principles of the present invention, this objective is obtained by providing a vehicle warning includes a tire pressure monitoring device disposed in each tire of the vehicle. Each tire pressure monitoring device obtains information regarding pressure within the associated tire and communicates the tire pressure information in a wireless manner. A receiver receives the communicated tire pressure information from each tire pressure monitoring device. A processor circuit, associated with the receiver, determines if the communicated tire pressure information from at least one of the tire pressure monitoring devices is significantly less than a tire pressure determined to be safe for vehicle operation and, if so, to generate a warning signal. A body control module, upon receiving the warning signal, automatically activates the hazard lights without driver input.

In accordance with another aspect of a disclosed embodiment, a method is provided for warning that a vehicle is operating under a hazardous condition. The method monitors tire pressure in each tire of the vehicle. The monitored tire pressure from each tire is received at a receiver. A processor circuit determines if any of the received tire pressures is significantly less than a tire pressure determined to be safe for vehicle operation. If the received tire pressure is determined to be significantly less than the tire pressure determined to be safe for vehicle operation, hazard lights of the vehicle are automatically activated without driver input.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 1:
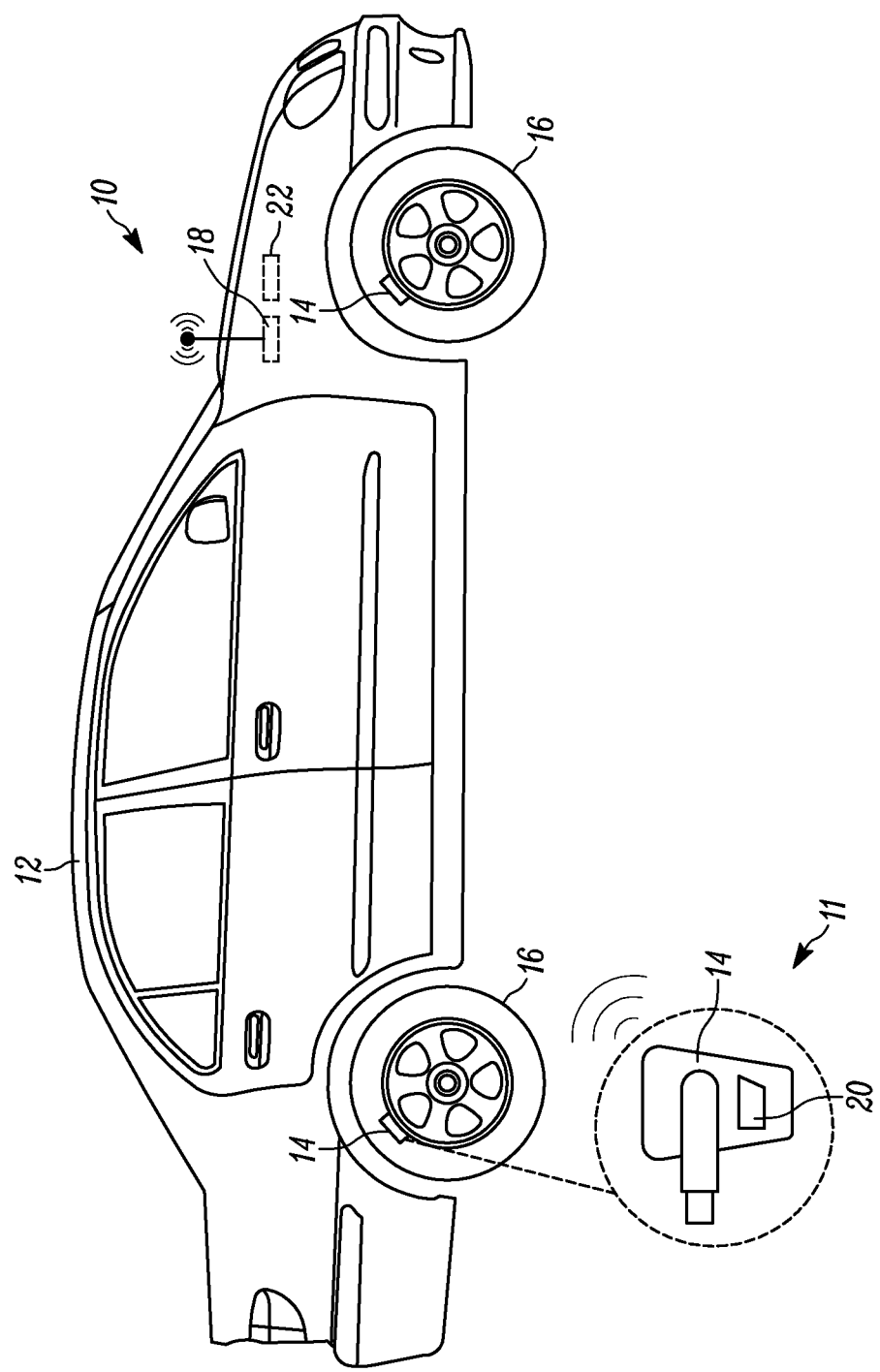
FIG. 1 is a view of vehicle having a warning system for automatically warning nearby vehicles upon detection of a sudden loss of tire pressure.
Figure 2:
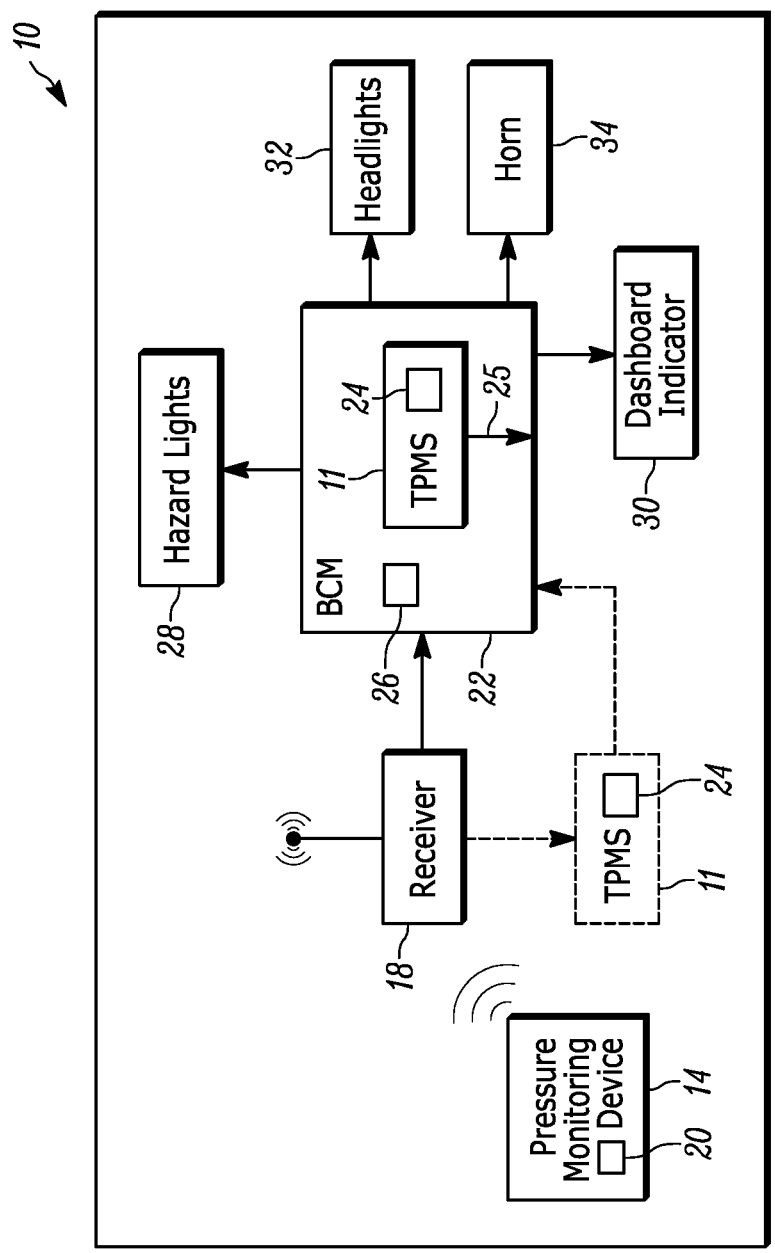
FIG. 2 is a block diagram of the system of FIG. 1.

With reference to FIGS. 1 and 2, a vehicle warning system for automatically warning nearby vehicles is shown, generally indicated at 10, in accordance with an embodiment and implemented in a vehicle 12. The system 10 includes a tire pressure monitoring system (TPMS), generally indicated at 11, which may be of the type disclosed in U.S. Pat. No. 8,742,914 B2, the content of which is hereby incorporated by reference into this specification. Thus, the TPMS 11 includes a tire pressure monitoring device 14 disposed within each of the vehicle's tires 16. The system 10 includes a receiver or transceiver 18 that receives communication transmitted from each of the pressure monitoring devices 14. The receiver 18 may be any communication device configured to receive any type of transmitted communication but tuned to only recognize some of these communications. In one example, these communications are radio frequency (RF) communications, but other types of communications are also possible.

Each of the tire pressure monitoring devices 14 is assembled within an associated tire 16 of the vehicle 12 and, as mentioned, communicates information indicative of conditions within the tire 16 to the receiver 18 in a wireless manner. These conditions include sensed pressure but may include temperature and/or any other desired information that aids in the evaluation of tire conditions.

Each tire pressure monitoring device 14 includes a memory device 20 that is utilized for the storage of a control program. The control program, once compiled and executed, enables transmission of sensed information (e.g., tire pressure information) according to one or more protocols (or formats) that govern operation and communication between the tire pressure monitoring device 14 and the receiver 18. Examples of communication protocols that may be used include protocols that specify the frequency and timing of transmissions from the tire pressure monitoring device 14 to the receiver 18. Tire pressure monitoring information may be transmitted according to the protocols sequentially (e.g., using the same antenna) or at the same time (e.g., using different antennas).

The TPMS 11 is preferably part of a body control module (BCM) 22 of the vehicle 12. However, the TPMS can be separate from the BCM 22. The receiver 18 can be separate from (see dashed lines in FIG. 2) or part of the BCM 22. In operation, a processor circuit 24 of the TPMS 11 receives tire pressure information from the receiver 18 that the receiver 18 had obtained from each of the tire pressure monitoring devices 14. The processor circuit 24 determines if the received tire pressure information from any one of the four tire pressure monitoring devices 14 is significantly less than a tire pressure determined to be safe for vehicle operation. In other words, the TPMS 11 can determine if the tire has experienced a sudden loss of pressure such as blow-out or is flat. If so, the processor circuit 24 generates a warning signal 25 to instruct a processor circuit 26 of the BCM 22 to bypass manual actuation and thus automatically activate the conventional hazard lights 28 of the vehicle 12 (without driver input) so as to warn drivers that are following the disabled vehicle of the hazardous incident that is occurring. An example of automatically activating the hazard lights in a vehicle is disclosed in U.S. Pat. No. 6,879,251 B2, the content of which is hereby incorporated by reference into this specification.

It is noted that although two processor circuits 24 and 26 are shown, a single processor circuit can be provided to control functions of both the BCM 22 and the TPMS 11. Preferably, the BCM 22 also simultaneously causes the conventional dashboard indicator 30 to illuminate so as to indicate to the driver that the hazard lights are on. In additional to automatically activating the hazard lights in event of significant tire pressure loss, the BCM 22, without driver input, can also automatically cause flashing the headlights 32 or automatically sound the horn 34 to provide a warning signal to drivers of vehicles in front of or beside the disabled vehicle. The hazards lights, horn, and headlights can be deactivated once the vehicle has been turned off and returned to their normal state.

Figure 3:
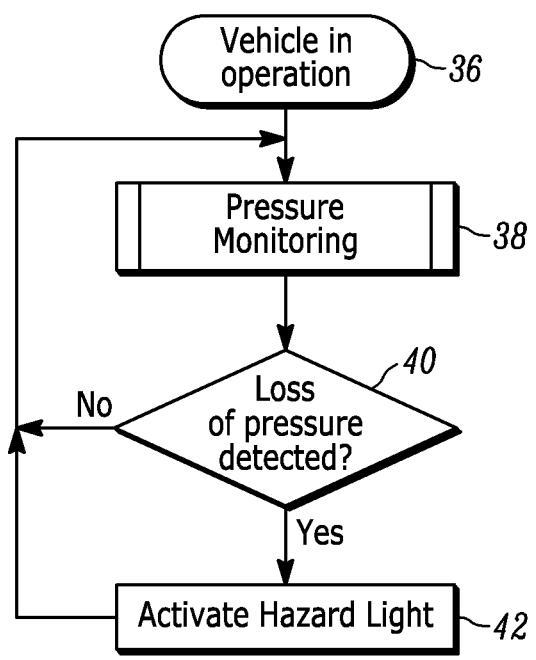
FIG. 3 is a flowchart showing the operation steps for the system of FIG. 1.

FIG. 3 is a flowchart showing the steps or algorithm of the system 10. Once the vehicle is operating (step 36), the tire pressure monitoring device 14 in each wheel continuously monitors the pressure in the associated tire 16 in step 38. In step 40, the processor circuit 24 determines if there is a loss of pressure in any of the tires of the vehicle. If tire pressure loss has occurred, in step 42, the BCM 22 activates at least the hazard lights 28 and if tire pressure is determined to be acceptable, the process returns to step 38.

The operations and algorithms described herein can be implemented as executable code within the TPMS 11 processor circuit 24 and/or the BCM 22 processor circuit 26 as described, or stored on a standalone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit causes the integrated circuit(s) implementing the processor circuit 24 and/or 26 to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit can be implemented, for example, using a non-volatile memory such as a programmable read only memory (PROM) or an EPROM, and/or a volatile memory such as a DRAM, etc.

Thus, it has been seen that the system 10 improves safety when a tire of a vehicle loses significant pressure by automatically activating the vehicle's hazard lights to warn other drivers without the disabled vehicle driver's manual input, since the driver is busy guiding the disabled vehicle to a stop.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A vehicle warning system, the vehicle having tires and hazard lights, the system comprising:
   a tire pressure monitoring device disposed in each tire of the vehicle, each tire pressure monitoring device being constructed and arranged to obtain information regarding pressure within the associated tire and to communicate the tire pressure information in a wireless manner,
   a receiver constructed and arranged to receive the communicated tire pressure information from each tire pressure monitoring device,
   a processor circuit, associated with the receiver, constructed and arranged to determine if the communicated tire pressure information from at least one of the tire pressure monitoring devices is significantly less than a tire pressure determined to be safe for vehicle operation and, if so, to generate a warning signal, and
   a body control module constructed and arranged, upon receiving the warning signal to automatically activate the hazard lights without driver input, and
   wherein the body control module is constructed and arranged, without driver input, to automatically cause flashing of headlights of the vehicle, simultaneously with activation of the hazard lights.

2. The system of claim 1, wherein each tire pressure monitoring device is constructed and arranged to communicate using radio frequency and wherein the receiver is a radio frequency receiver.

3. The system of claim 1, wherein the body control module is constructed and arranged, without driver input, to automatically cause a horn of the vehicle to sound, simultaneously with activation of the hazard lights.

4. The system of claim 1, wherein the body control module is constructed and arranged, without driver input, to automatically illuminate a dashboard indicator that indicates to the driver that the hazard lights are on, simultaneously with activation of the hazard lights.

5. The system of claim 1, wherein the body control module is constructed and arranged to automatically activate the hazard lights upon a blow-out of at least one of the tires.

6. A method of warning that a vehicle is operating under a hazardous condition, the method comprising the steps of:
   monitoring tire pressure in each tire of the vehicle,
   receiving, at a receiver, the monitored tire pressure from each tire, determining, in a processor circuit, if any of the received tire pressures is significantly less than a tire pressure determined to be safe for vehicle operation, and if the received tire pressure is significantly less than the tire pressure determined to be safe for vehicle operation, automatically activating hazard lights of the vehicle without driver input, wherein the step of automatically activating the hazard lights includes using a body control module of the vehicle, and wherein, simultaneously with the activation of the hazard lights, the method further comprises using the body control module to automatically cause flashing of headlights of the vehicle, without driver input.

7. The method of claim 6, wherein the step of monitoring includes using a tire pressure monitoring device disposed in each tire.

8. The method of claim 7, wherein each tire pressure monitoring device communicates the monitored tire pressure to the receiver using radio frequency communication.

9. The method of claim 6, wherein, simultaneously with the activation of the hazard lights, the method further comprises using the body control module to automatically cause a horn of the vehicle to sound, without driver input.

10. The method of claim 6, wherein, simultaneously with the activation of the hazard lights, the method further comprises using the body control module to automatically illuminate a dashboard indicator that indicates to the driver that the hazard lights are on.

11. The method of claim 6, wherein the activating step includes automatically activating the hazard lights upon a blow-out of at least one of the tires.

\* \* \* \* \*